US008948551B2

(12) United States Patent
Héroux et al.

(10) Patent No.: US 8,948,551 B2
(45) Date of Patent: Feb. 3, 2015

(54) REDUCING LOSS AT INTERSECTION IN OPTICAL WAVEGUIDES

(75) Inventors: Jean Benoit Héroux, Tokyo (JP); Sayuri Kohara, Kanagawa (JP); Yoichi Taira, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 13/807,584

(22) PCT Filed: Jun. 22, 2011

(86) PCT No.: PCT/JP2011/064279
§ 371 (c)(1),
(2), (4) Date: Dec. 28, 2012

(87) PCT Pub. No.: WO2012/002222
PCT Pub. Date: Jan. 5, 2012

(65) Prior Publication Data
US 2013/0101256 A1    Apr. 25, 2013

(30) Foreign Application Priority Data
Jun. 30, 2010  (JP) ................................. 2010-149255

(51) Int. Cl.
*G02B 6/125*     (2006.01)
*G02B 6/12*      (2006.01)

(52) U.S. Cl.
CPC ........ *G02B 6/125* (2013.01); *G02B 2006/1219* (2013.01)
USPC ............................................ 385/14; 385/129

(58) Field of Classification Search
None
See application file for complete search history.

(56) References Cited

U.S. PATENT DOCUMENTS

| 4,130,342 | A | * | 12/1978 | McMahon ...................... 385/17 |
| 4,747,653 | A | | 5/1988 | Kahn |
| 5,157,756 | A | | 10/1992 | Nishimoto |

(Continued)

FOREIGN PATENT DOCUMENTS

| CN | 101529294 A1 | 9/2009 |
| JP | 50092149 A | 7/1975 |

(Continued)

OTHER PUBLICATIONS

English translation of written opinion for PCT/JP2011/064279, date of mailing Oct. 4, 2011.*

(Continued)

*Primary Examiner* — Mike Stahl
(74) *Attorney, Agent, or Firm* — Tutunjian & Bitetto, P.C.; Jennifer R. Davis

(57) ABSTRACT

A core intersection in an optical waveguide formed of a plurality of cores and a clad that surrounds the cores is disclosed, the structure characterized in that the same material as that of the cores is added to two planes, upper and lower planes, of each of core intersection spaces where the plurality of cores intersect (instead of using a clad material). The structure of a core intersection in an optical waveguide formed of a plurality of cores and a clad is disclosed, the structure characterized in that four planes that divide (isolate) each of core intersection spaces where the plurality of cores intersect, that is, four discontinuity spaces between the core intersection space and the cores connected thereto, are filled with the same material as that of the clad (instead of using a core material so that the core intersection space is seamlessly connected to surrounding core intersection spaces).

6 Claims, 9 Drawing Sheets

(a)

(b)

(56) References Cited

U.S. PATENT DOCUMENTS

| | | | |
|---|---|---|---|
| 5,894,535 A * | 4/1999 | Lemoff et al. | 385/47 |
| 2005/0213873 A1* | 9/2005 | Piede et al. | 385/14 |
| 2005/0281502 A1* | 12/2005 | Kobayashi | 385/14 |
| 2011/0153283 A1* | 6/2011 | Kohara et al. | 703/1 |
| 2011/0194815 A1* | 8/2011 | Fattal et al. | 385/31 |
| 2011/0243516 A1* | 10/2011 | Aoki | 385/123 |

FOREIGN PATENT DOCUMENTS

| | | |
|---|---|---|
| JP | 53-092149 | 8/1978 |
| JP | 53164161 U | 12/1978 |
| JP | S54161349 A | 12/1979 |
| JP | H0387704 A | 4/1991 |
| JP | 03-287206 | 12/1991 |
| JP | H10319262 A | 12/1998 |
| JP | 2004205537 A | 7/2004 |
| JP | 2006139149 A | 6/2006 |
| JP | 2009145867 A | 7/2009 |

OTHER PUBLICATIONS

Aretz, K., et al. "Reduction of Crosstalk and Losses of Intersecting Waveguide" Electronics Letters, vol. 25. No. 11. May 1989. pp. 730-731.

* cited by examiner

Figure 2 (PRIOR ART)
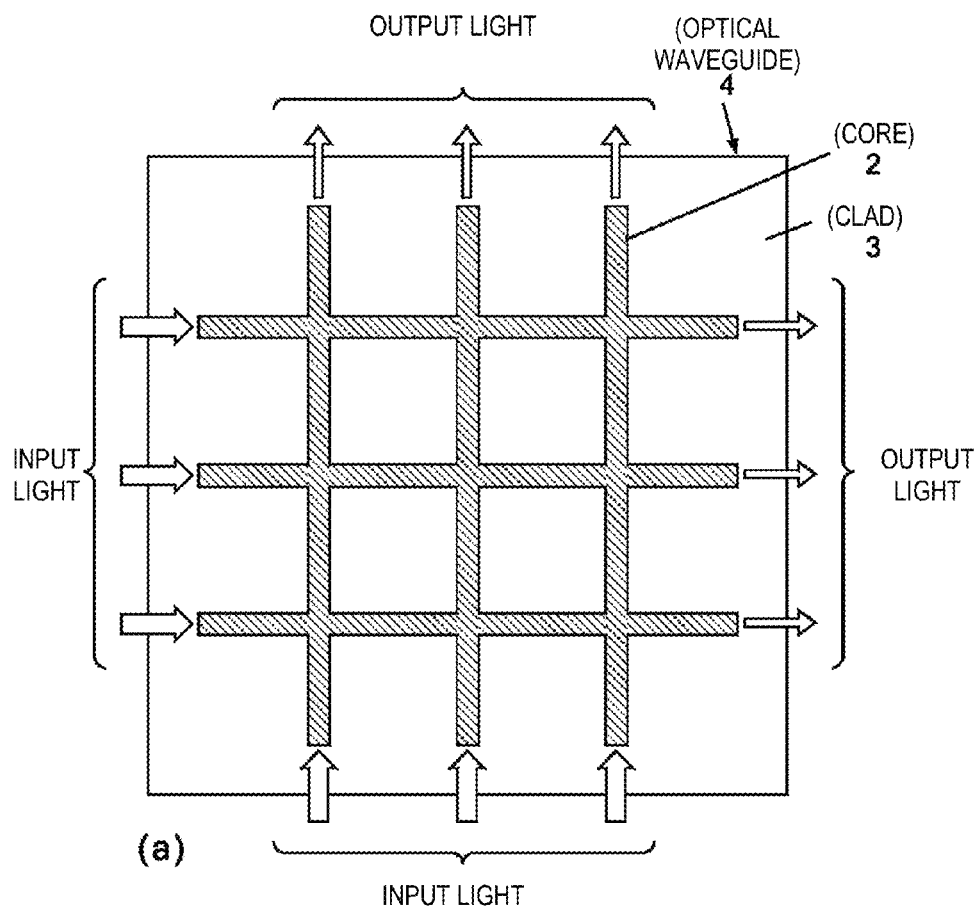
(a)
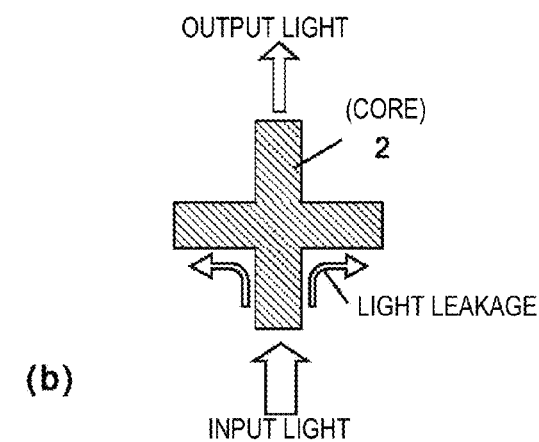
(b)

Figure 4
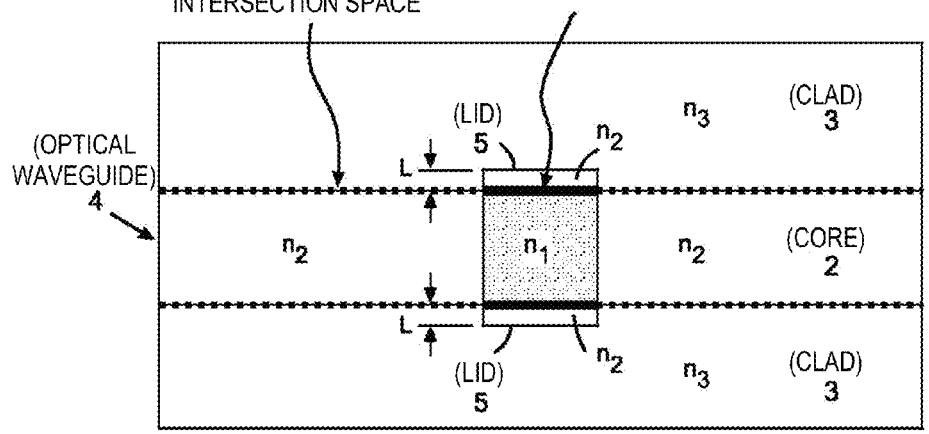
(a)
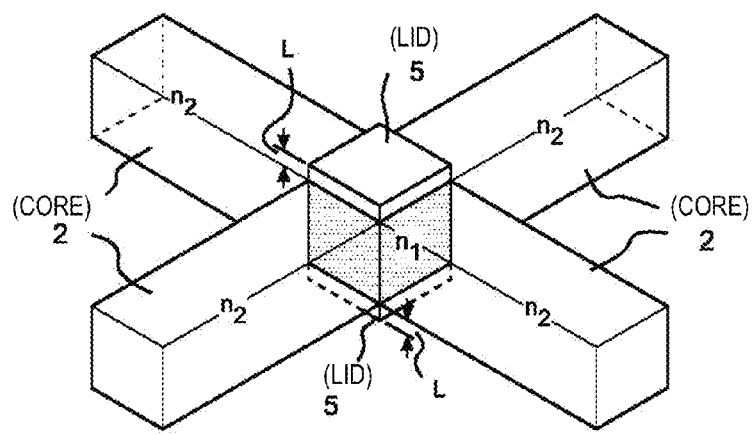
(b)

Figure 5
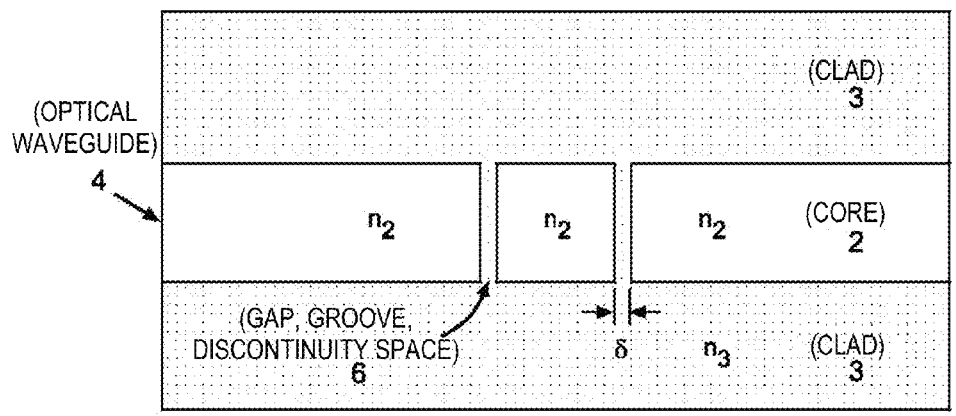
(a)
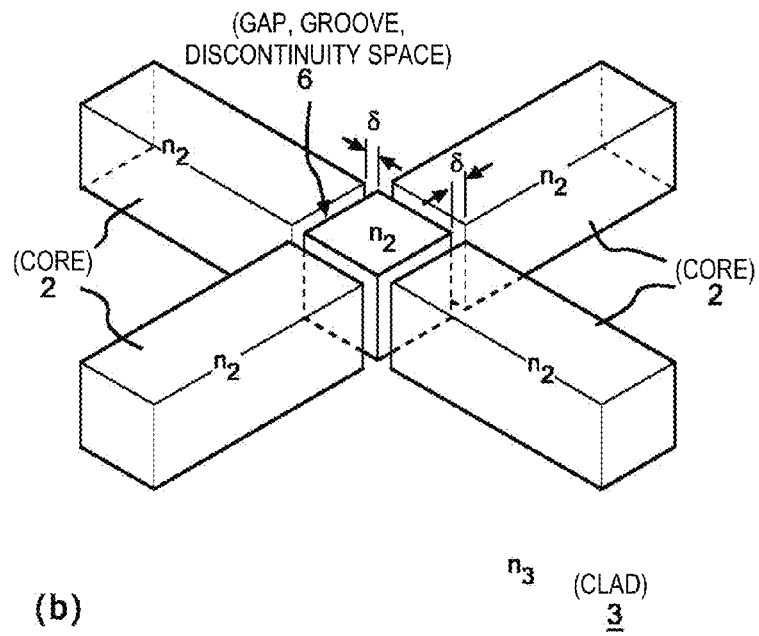
(b)

Figure 6
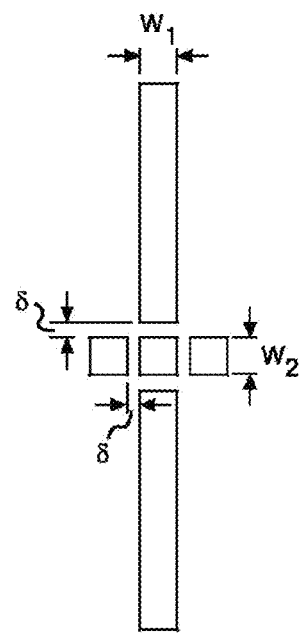
(a)
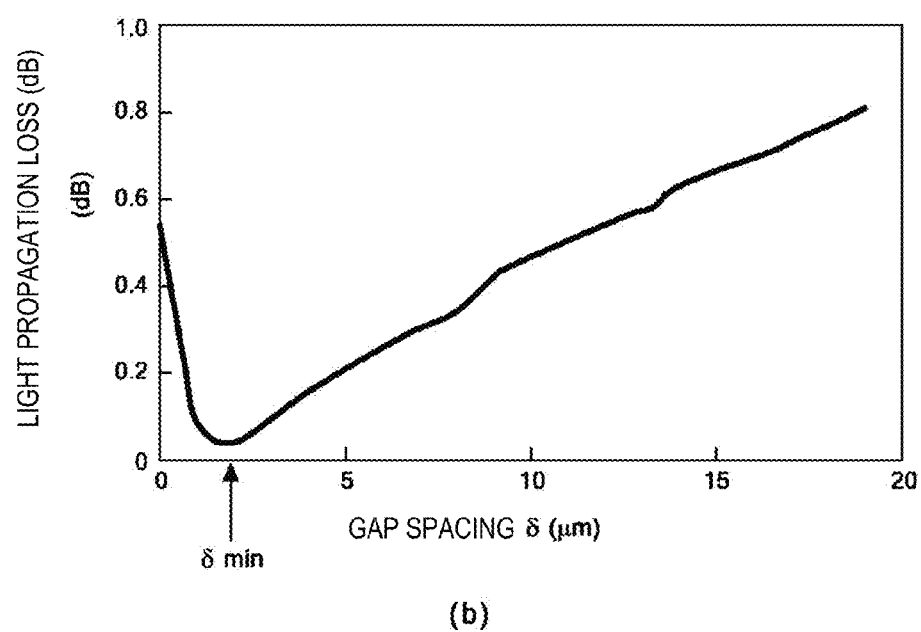
(b)

Figure 9
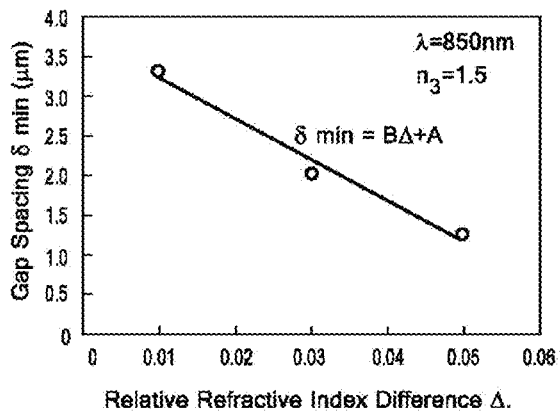
(a)
$$\Delta = \frac{n_2^2 - n_3^2}{2n_3^2}$$
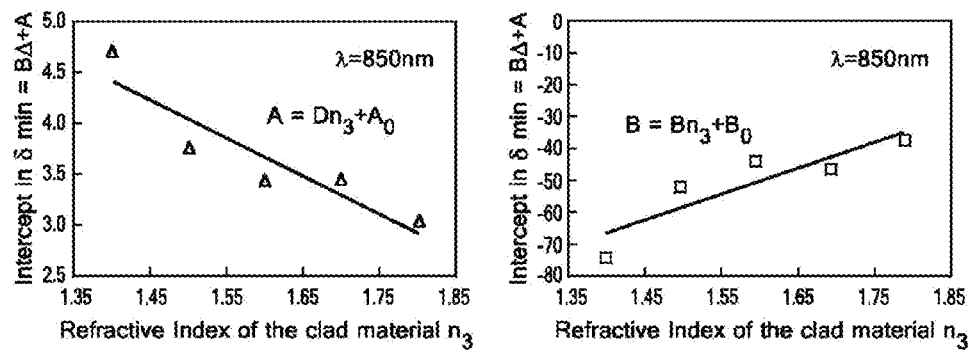
(b)
PARAMETERS IN EQUATIONS 4 AND 5 VERSUS WAVELENGTH λ
| | 850nm | 980nm | 1350nm |
|---|---|---|---|
| A0 | 9.7 | 10.2 | 20 |
| D | -3.8 | -3.8 | -10 |
| B0 | -180 | -131 | -340 |
| E | 80 | 48 | 170 |
(c)

REDUCING LOSS AT INTERSECTION IN OPTICAL WAVEGUIDES

TECHNICAL FIELD

The present invention relates to an optical waveguide having intersections and a method for manufacturing the same.

BACKGROUND

In recent years, to solve signal delay, faster transmission rates, and other problems due to higher packing density and performance of electronic systems, optical wiring that excels in packing density and parallelism has received attention.

Since an optical circuit essential to optical wiring has been expensive, an optical waveguide made of a resin material (such as a plastic material), which can be manufactured at low cost by using a simple method, is considered as a promising technology.

An optical waveguide is primarily formed of a core and a clad and typically has a configuration in which the clad surrounds the core. Reflection and refraction, according to which light propagates, are repeated in accordance with the difference in refractive index between the core and the clad as well as the angle of incidence of the light that impinges on the interface between the core and the clad.

Optical waveguides and their cores are made on a planar substrate because of ease of fabrication and cost. Optical wiring using an optical waveguide having such a planar structure, however, sometimes requires intersections of a plurality of cores. The optical loss at the intersections has to be minimized although optical loss at the intersections is inevitable.

In an optical waveguide having intersections, to reduce the amount of light leakage at the intersections, Patent Literature 1 describes a method for designing a two-dimensional planar structure in which the difference among three refractive indices n satisfies n1 (intersection of cores)>n2 (core)>n3 (clad) and a method for manufacturing an optical waveguide having the two-dimensional planar structure.

Patent Literature 1, however, does not describe a design in which each of the intersections of cores is taken as a three-dimensional structure and the characteristics of the interfaces present above and below the intersection of cores are also taken into consideration.

Patent Literature 2 describes an X-shaped intersection optical waveguide having an intersection of cores intersecting each other. In the optical waveguide, an effective refractive index discontinuity band (impurity region or groove) is formed at each portion where a core to be connected to the intersection is connected to the intersection.

The X-shaped intersection optical waveguide, however, does not have a configuration in which the discontinuity band divides the entire core but has a configuration in which only the thickness of an upper clad layer provided above the core is changed. Further, the purpose of the X-shaped intersection optical waveguide is only to allow the effective refractive index discontinuity band to function as a light blocking region to reduce the amount of light leakage at the intersection when light propagates therethrough.

Patent Literature 3 describes an optical waveguide having a lattice-shaped core layer formed therein and also having slits that extend parallel to the direction in which light travels and isolates an intersection in the core layer and a method for manufacturing the optical waveguide. In Patent Literature 3, the slits are provided to prevent optical loss.

Patent Literature 3, however, does not describe filling the divided portions with a clad material or does not give consideration of using the same material not only to fill the three-dimensionally divided portions but also to form the portions above and below the divided portions.

PATENT LITERATURE

[Patent Literature 1] Published Unexamined Patent Application No. 2004-205537
[Patent Literature 2] Published Unexamined Patent Application No. 3-287206
[Patent Literature 3] Published Unexamined Patent Application No. 2006-139149

SUMMARY OF INVENTION

An object of the present invention is to reduce the amount of optical loss at six planes of each core intersection space (typically having a cubic shape) formed by a plurality of intersecting cores. Reducing the amount of optical loss, in other words, reduces the amount of light leakage for trapping light, which technically contributes over the prior art.

A first embodiment of the present invention discloses the structure of a core intersection in an optical waveguide formed of a plurality of cores and a clad, the structure characterized in that the same material as that of the cores is added to two planes, upper and lower planes, of each of core intersection spaces where the plurality of cores intersect (instead of using a clad material).

A second embodiment of the present invention discloses the structure of a core intersection in an optical waveguide formed of a plurality of cores and a clad, the structure characterized in that four planes that divide (isolate) each of core intersection spaces where the plurality of cores intersect, that is, four discontinuity spaces between the core intersection space and the cores connected thereto, are filled with the same material as that of the clad (instead of using a core material so that the core intersection space is seamlessly connected to surrounding core intersection spaces).

In a core intersection space (typically having a cubic shape) formed by a plurality of intersecting cores, the amount of light propagation loss (light leakage) can be reduced, and light can be trapped.

BRIEF DESCRIPTION OF THE DRAWINGS

FIG. 2 is a schematic view showing the relationship between input/output of light to and from the optical waveguide shown in FIG. 1 and leakage of the light;
FIG. 4 shows the configuration of an intersection in an optical waveguide according to a first embodiment of the present invention;
FIG. 5 shows the configuration of an intersection in an optical waveguide according to a second embodiment of the present invention;
FIG. 6 shows a model used to calculate the amount of propagation loss at an intersection in the optical waveguide according to the second embodiment of the present invention and also shows light propagation loss calculated by using the model along with a beam propagation method.

FIG. 9 shows how to determine a gap spacing δmin that minimizes light propagation loss for a relative difference in refractive index Δ in the optical waveguide according to the second embodiment of the present invention.

DETAILED DESCRIPTION OF PREFERRED EMBODIMENTS

Figure 1:
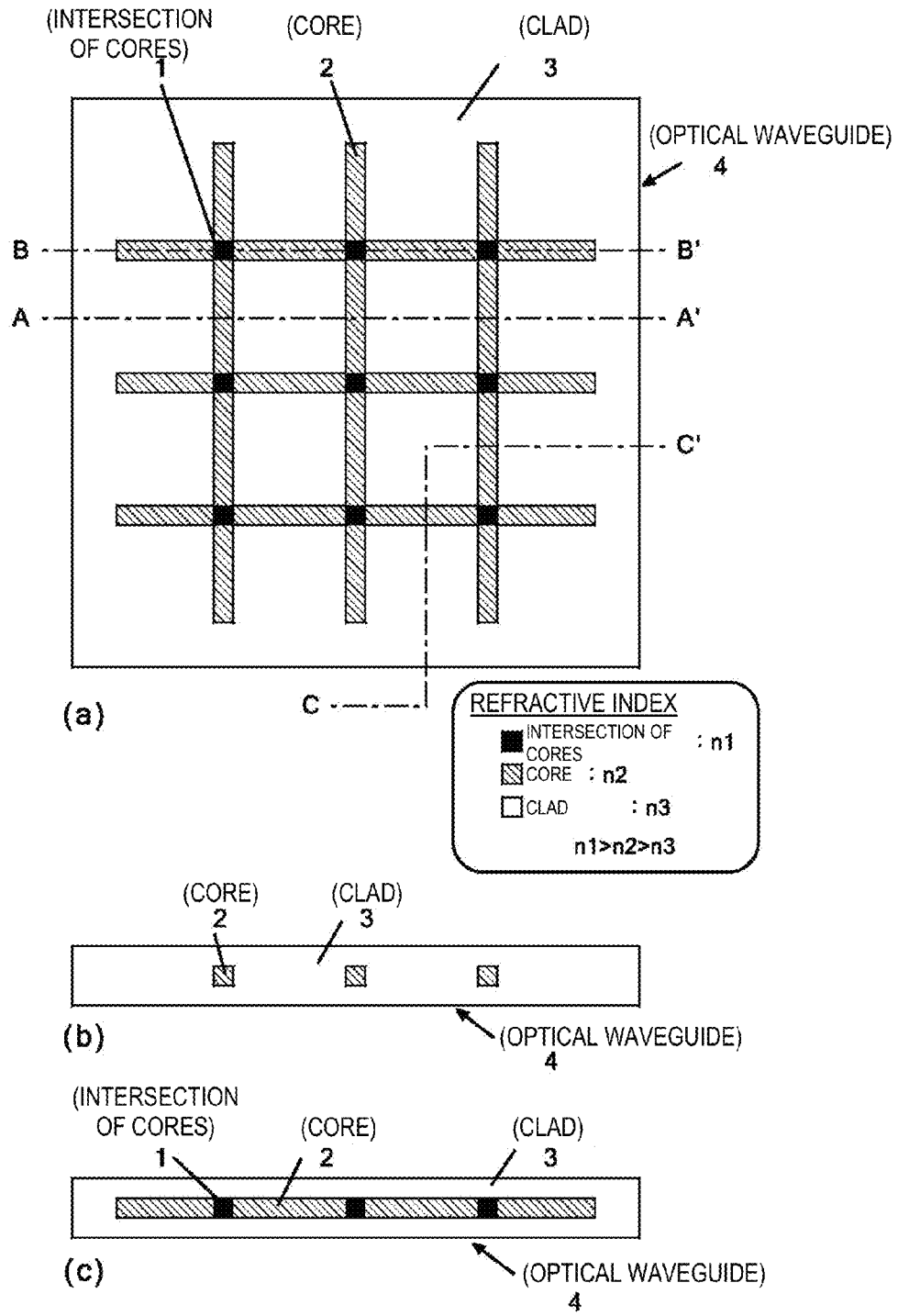
FIG. 1 is a schematic view showing a key configuration of an optical waveguide.

FIG. 1 is a schematic view showing a key configuration of an optical waveguide. FIG. 1(a) is a plan view of the optical waveguide. The optical waveguide 4 is formed of cores 2 and a clad 3.

In the example shown in FIG. 1, three linear cores 2 are arranged parallel to one another in the vertical direction, and three linear cores 2 are arranged parallel to one another in the horizontal direction. The vertically arranged cores 2 and the horizontally arranged cores are not parallel to each other but intersect each other at right angles in the plan view. The cores 2 thus form a lattice.

As long as a plurality of cores 2 are arranged in the form of a monolayer core that includes a combination of cores not parallel to one another in a plane, intersections 1 of the cores 2 are created, which is inevitable in a geometric sense. The example shown in FIG. 1 shows nine intersections 1 of the cores. The clad 3 is disposed in such a way that it surrounds the plurality of cores 2 and forms interfaces in accordance with the relationship with the plurality of cores 2.

FIG. 1(b) is a cross-sectional view taken along the line A-A' in FIG. 1(a), and FIG. 1(c) is a cross-sectional view taken along the line B-B' in FIG. 1(a). Assume now that the difference among three refractive indices n satisfies n1 (intersection of cores)>n2 (core)>n3 (clad). This refractive index setting is also described in Patent Literature 1.

FIG. 2 is a schematic view showing the relationship between input/output of light to and from the optical waveguide shown in FIG. 1 and leakage of the light. As shown in FIG. 2(a), input light linearly propagates through the cores 2, and 100% of the input light, if possible, is ideally guided through the cores 2 as output light. At each of the intersections, however, part of the light leaks into the horizontally intersecting core, resulting in optical loss, as shown in FIG. 2(b).

In the example shown in FIG. 2(a), the input light can flow in two directions: In one case, the input light is inputted from the left side and outputted to the right side, and in the other case, the input light is inputted from the lower side and outputted to the upper side. It is therefore understood that not only optical loss that occurs when light flows in one direction in the plan view but also light propagation loss that occurs when light flows in two-dimensionally different directions in the plan view need to be taken into consideration.

Figure 3:
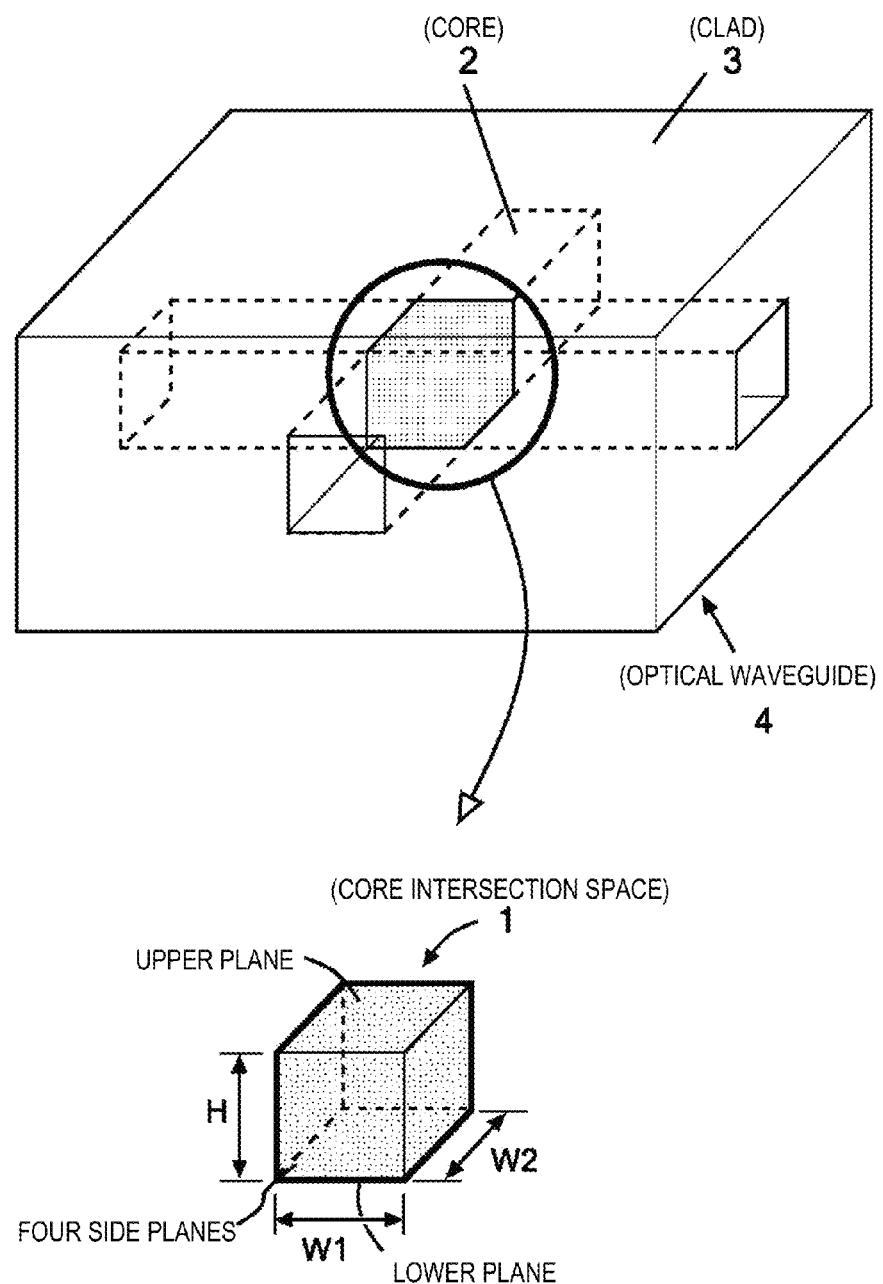
FIG. 3 is a perspective view of the structure of an intersection of cores.

FIG. 3 is a perspective view of the structure of an intersection of cores and a cross-sectional view taken along the line C-C' in FIG. 1(a). A core intersection 1, which is a space (always) having a fixed height (thickness) H, has a cubic shape when a plurality of cores 2 intersect each other at right angles (90 degrees in FIG. 1(a)). The widths of the core intersection 1 are W1 and W2. When a plurality of cores 2 intersect each other obliquely and each pair of cores 2 form an X shape (intersect at an intersecting angle other than 90 degrees in FIG. 1(a)), the resultant space has a diamond-like shape having a height (thickness) H. The core intersection 1 is hereinafter sometimes referred to as a core intersection space 1.

The core intersection space 1 has six planes: an upper plane, a lower plane, and four side planes. Now look at the core intersection space 1 and the surroundings thereof. The upper plane of the core intersection space 1, where the clad 3 is disposed (surrounds the core intersection space 1), is in contact with the interface with the clad material, whereas the lower plane of the core intersection space 1, where the clad 3 is disposed (surrounds the core intersection space 1), is in contact with the interface with the clad material. On the other hand, the four side planes of the core intersection space 1 are seamlessly connected to surrounding cores 2 (to form seamless space).

The above description made with reference to FIGS. 1, 2, and 3 is the same as that made in Patent Literature 1, which is prior art. In the present invention, all or part of the prior art is incorporated as a basic configuration, and the following description will be made of an improvement of the configuration.

FIG. 4 shows the configuration of an intersection in an optical waveguide according to a first embodiment of the present invention. The configuration shown in FIG. 4 is characterized in that portions on two planes, the upper and lower planes, of the core intersection space 1 described with reference to FIG. 3 are made of the same material as that of the cores 2 so that the same material as that of the cores 2 forms interfaces with the clad 3. In other words, the structure shown in FIG. 4 is characterized in that the portions on the upper and lower planes of the core intersection space 1 are not made of the clad material but form lids made of the same material as that of the cores 2.

The cross-sectional shape of each of the cores 2 is preferably substantially square to allow light to propagate isotropically. When the cross-sectional shape of each of the cores 2 is square, the core intersection space 1 has a cubic shape.

Technical significance of employing the characteristic configuration described above is an ability to adjust the refractive index ratio at each of the two interfaces, the upper and lower interfaces, of the core intersection space 1. In other words, the overall refractive index ratio is so adjusted that the refractive index ratio at the interfaces of the core intersection space 1 is (continuously) equal to the refractive index ratio at the interfaces of the core 2 that do not belong to the core intersection space 1.

In practice, since the refractive index of the core intersection space 1 is n1 and the refractive index of each of the lids made of the same material as that of the cores 2 is n2, the refractive index ratio at the upper and lower interfaces is n2/n1.

On the other hand, since the refractive index ratio at the interfaces where the cores 2 in locations that do not belong to the core intersection space 1 are in contact with the clad 3 is n3/n2, the design concept characterized in that the refractive index ratio does not change (keeps constant) across the plurality of interfaces described above can be expressed by the following Equation 1:

$$n2/n1 = n3/n2 \quad \text{(Equation 1)}$$

The height (thickness) L of each of the lids may be high enough not to change the refractive index ratio (but to keep the refractive index ratio constant) across the interfaces, in practice, to reduce the amount of leakage of the input light from the optical waveguide. The height also depends on the wavelength of the input light and the mode thereof and can be adjusted as appropriate in a design process.

As described above, the core intersection space 1, the cores 2, and the clad 3 can be designed by using materials having different refractive indices. Further, it has been known that the refractive index can be changed in a later stage by using an effect that is expressed later to a material of interest, for example, irradiating the material with light. Such an effect can be used in the present invention.

The optical waveguide can therefore be made of a resin material and formed in a photo-curing process or any other suitable process. The configuration including the lids described above can be manufactured in a lithographic patterning process.

For example, there is a known resin material whose refractive index increases when irradiated with light, specifically, the refractive index increases by a greater amount when the amount of light exposure is greater. On the other hand, there is also a known resin material whose refractive index decreases when irradiated with light, specifically, the refractive index decreases by a greater amount when the amount of light exposure is greater. Such a material can be readily used in a process of forming the lids in a lithographic patterning process.

FIG. 5 shows the configuration of an intersection in an optical waveguide according to a second embodiment of the present invention. The configuration is characterized in that four discontinuity spaces between each pair of the cores 2 and the corresponding core intersection space 1, which are the four side planes that divide (isolate) the core intersection space 1 described with reference to FIG. 3, that is, locations where the core 2 should normally be connected to the core intersection space 1, are filled with the same material as that of the clad 3. In other words, the structure shown in FIG. 5 is characterized in that the four side planes of the core intersection space 1 are not filled with the core material so that the core intersection space 1 is seamlessly connected to the adjacent cores 2 but are filled with the same material as that of the clad 3.

The structure is, in other words, designed in consideration of using the same material not only to fill the discontinuity spaces, which are three-dimensionally divided portions, but also to form the portions above and below the discontinuity spaces. That is, the divided cores are filled with the clad material and hence bridged thereby.

Each of the discontinuity spaces is in some cases described, for example, as a gap or a groove (of cores, which is (should be) normally seamlessly connected but not in practice) in a geometric sense. The discontinuity spaces may be formed in a lithographic patterning process or may be formed by temporarily forming a seamless core, cutting it to create discontinuity spaces in laser or mechanical processing, and filling the discontinuity spaces with the clad material. Since the same clad material as the clad material of the portions above and below the discontinuity spaces, the filling process can be readily carried out.

FIG. 6 shows a model used to calculate the amount of loss at an intersection in the optical waveguide according to the second embodiment of the present invention and also shows propagation loss calculated by using the model along with a beam propagation method. FIG. 6(a) shows a model used in a case where a gap is provided at each of the four side planes.

The conditions used in the calculation are as follows: The refractive index $n_2$ of the core 2 is 1.593 (a value selected from 1.4 to 1.6); the refractive index $n_3$ of the clad 3 is 1.542 (a value selected from 1.4 to 1.6); a relative difference in refractive index $\Delta$, which is shown below the horizontal axis of FIG. 9(a) (Equation 2), is 5%; the core intersection space 1 has a cubic shape; the core 2 has a square cross-sectional shape and H=W1=W2=35 μm; and the wavelength λ of inputted light is 850 nm.

FIG. 6(b) shows propagation loss calculated by using the model. In FIG. 6(b), the horizontal axis represents the gap spacing, and the vertical axis represents the loss. This model is significant particularly when the groove spacing δ is 2 μm (δmin) or has a value in the vicinity thereof. In other words, the model is significant in a numerical range of the groove spacing δ from 1 to 6 μm, more significant in a numerical range from 1 to 4 μm. FIG. 6(b) shows that the light propagation loss is minimized when the groove spacing is δmin.

Figure 7:
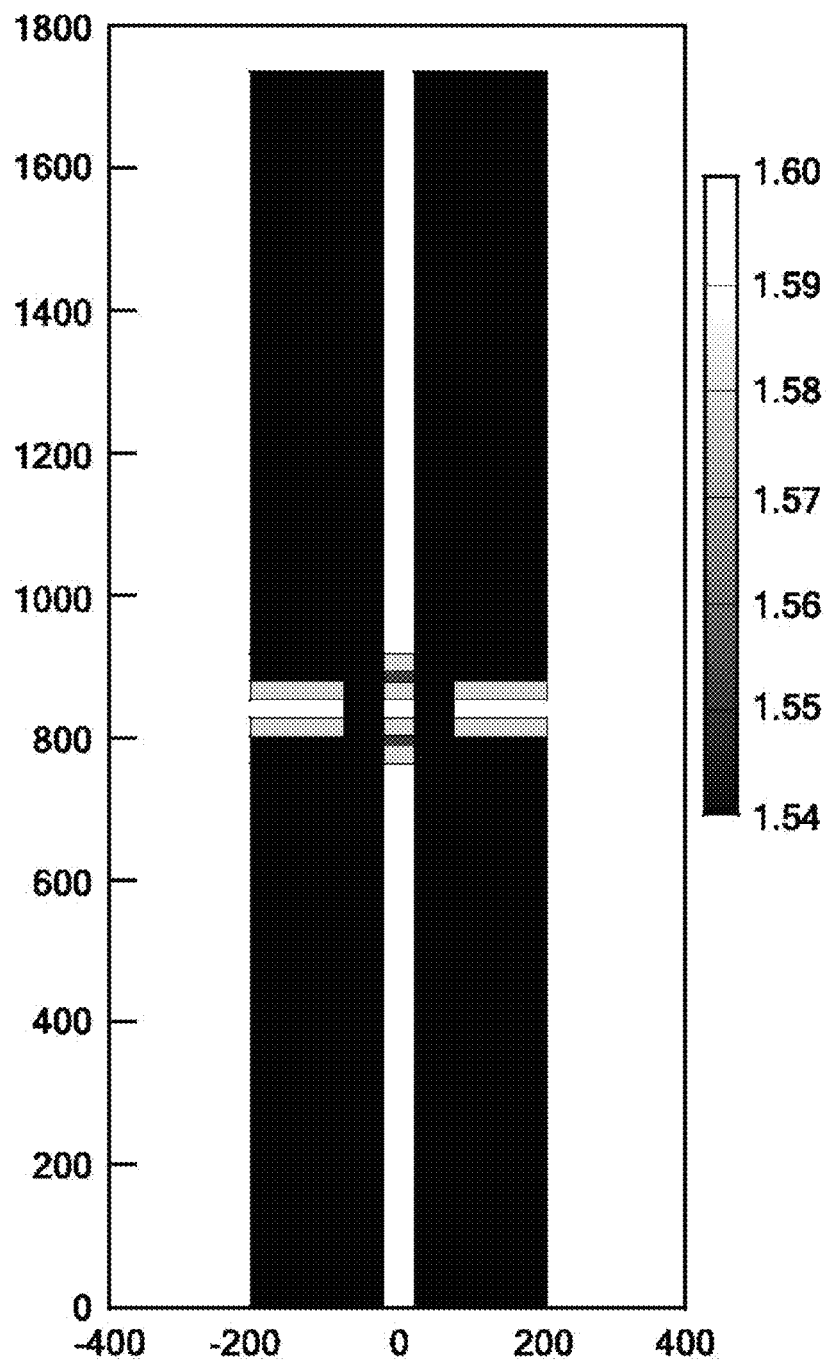
FIG. 7 shows a refractive index distribution corresponding to the model shown in FIG. 6.

FIG. 7 shows a refractive index distribution corresponding to the model shown in FIG. 6. In FIG. 7, the horizontal axis represents the position in the direction perpendicular to the direction in which light propagates, and the vertical axis represents the position in the direction in which the light propagates. An intersection is positioned at the center of the vertical axis. The unit of the numerical values in FIG. 7 is the wavelength of the incident light (850 nm).

Figure 8:
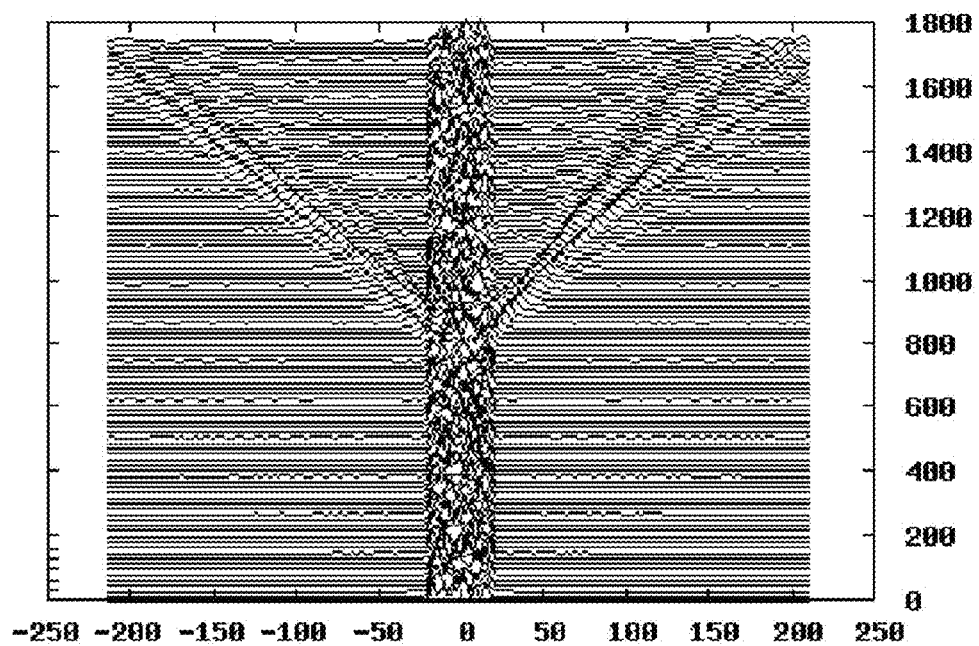
FIG. 8 shows the distribution of an electric field intensity of light calculated by using a beam propagation method (BPM)

FIG. 8 shows the distribution of an electric field intensity of the light calculated by using a beam propagation method (BPM). In FIG. 8, the horizontal and vertical axes correspond to those measured in correspondence with FIG. 7, and the horizontal axis is scaled twice as large as that in FIG. 7. FIG. 8 shows variations extending in a fan shape, indicating that the light leaks, although the amount of which is small, at the intersection.

FIG. 9 shows how to determine a gap spacing δmin that minimizes the light propagation loss for an arbitrary refractive index $n_3$ of the clad and an arbitrary relative difference in refractive index $\Delta$ in the optical waveguide according to the second embodiment of the present invention. FIG. 9(a) shows the gap spacing δmin that minimizes the propagation loss when light of a wavelength of 850 nm is incident on the optical waveguide according to the second embodiment of the present invention shown in FIG. 6 versus the relative difference in refractive index $\Delta$ between the clad and the core. FIG. 9(a) shows a case where the refractive index $n_3$ of the clad is 1.5 and the wavelength of the light is 850 nm. The line in FIG. 9(a) is a graph representing the relationship between δmin and $\Delta$ but after linear approximation. The relationship between δmin and $\Delta$ can be similarly processed by using linear approximation for other values of $n_3$. FIG. 9(b) shows the intercept A and the slope B of the graph representing the relationship between δmin and $\Delta$ shown in FIG. 9(a) after linear approximation versus the refractive index $n_3$ of the clad. The lines in FIG. 9(b) are graphs representing the relationships described above after linear approximation. FIG. 9(c) is a table containing the intercept A0 and the slope D of the graph representing the relationship between A and $n_3$ after linear approximation versus the wavelength. FIG. 9(c) also shows the intercept B0 and the slope E of the graph representing the relationship between B and $n_3$ after linear approximation versus the wavelength. From the table, the gap spacing δmin that minimizes the light propagation loss can be calculated for an arbitrary relative difference in refractive index $\Delta$ and an arbitrary refractive index $n_3$ of the clad.

The theoretical calculation described above was carried out under the following conditions:

<Range of Groove Spacing>

The range of the groove spacing is calculated under the following conditions:

Refractive index of clad $n_3$: 1.4 to 1.8
Wavelength of incident light λ: 850 to 1350 nm
Relative difference in refractive index $\Delta$ between core and clad: 1 to 5%
Width and height of core in waveguide W1, W2, and H: 30 to 50 μm (W1=W2=H in this calculation)

<How to Determine Groove Spacing>

The groove spacing δmin that minimizes the light propagation loss in the optical waveguide for an arbitrary refractive index n3 of the clad, an arbitrary wavelength λ of light, and a specific relative difference in refractive index between the clad and the core can be determined by using the following method. The graph shown in FIG. 9(a) represents δmin that minimizes the light propagation loss in the optical waveguide versus the relative difference in refractive index Δ with δmin calculated by using the beam propagation method when the refractive index n3 of the clad is 1.5. The resultant data having undergone linear approximation is as follows:

$$\delta\min = B\Delta + A \quad \text{(Equation 3)}$$

In Equation (3), B represents the slope and A represents the Y intercept. The linear approximation can be performed similarly for other values of the refractive index n3 of the clad to determine the slope and the Y intercept.

The graphs shown in FIG. 9(b) represent the slope A and the Y intercept B versus the refractive index n3 of the clad. The graphs having undergone linear approximation are expressed by the following equations:

$$A = Dn3 + A0 \quad \text{(Equation 4)}$$

$$B = En3 + B0 \quad \text{(Equation 5)}$$

In Equations 4 and 5, D and E represent parameters of the slope of the respective graphs, and A0 and B0 are parameters of the Y intercept of the respective graphs.

The groove spacing δmin that minimizes the light propagation loss can therefore be determined as follows:
1. Determine the values of A and B for a desired value of n3 by using Equations (4) and (5).
2. Determine δmin by using Equation (3) along with the values of A and B obtained in 1.

When the dimensions of the intersection space are H (height)=W1 (width)=W2 (width)=35 μm and the relative difference in refractive index Δ=5%, the groove spacing (δ) is determined to be 2 μm.

When the dimensions of the intersection space are H (height)=W1 (width)=W2 (width)=30 to 50 μm and the relative difference in refractive index Δ=2 to 5%, the groove spacing (δ) is determined to be 1 to 6 μm.

The present invention has been described with reference to a step-index fiber, whose refractive index changes stepwise at the "interface" between the core and the clad. The present invention is also applicable to a graded-index fiber (GI fiber), in which the refractive index of the core is not uniform but is graded. In a GI fiber, the refractive index has the highest value at the center, gradually decreases toward the periphery of the core, and becomes equal to the refractive index of the clad at the interface therewith. The refractive index of a GI fiber does not change stepwise at the interface between the core and the clad.

That is, the "interface" is "formed in accordance with the relationship" between the core and the clad and is not necessarily clearly defined as a fixed space or a fixed physical position. Reflection and refraction, according to which light propagates, are repeated depending on the wavelength λ and in accordance with the angle of incidence of the light that impinges on the "interface." The meaning of the term "interface" should be widely construed within the technical concept of the present invention.

It is therefore noted that the setting of the refractive indices is not necessarily made in accordance with exactly homogeneous materials having refractive indices n1 for the core intersection region, n2 for the core, and n3 for the clad, but that the technical concept of the present invention can be achieved in some cases by those skilled in the art to which the present invention belongs.

DESCRIPTION OF SYMBOLS 1 core intersection, core intersection space
2 core
3 clad
4 optical waveguide
5 lid
6 gap, groove, discontinuity space
H height (of core intersection space)
L height (thickness) of lid
n1 refractive index (core intersection)
n2 refractive index (core)
n3 refractive index (clad)
W1 width (of core intersection space)
W2 width (of core intersection space)

The invention claimed is:

1. An optical waveguide, comprising:
a plurality of linear cores arranged in a plane in a form of a monolayer core, including a combination of cores not parallel to one another in the plane, and made of a material having a refractive index n2;
a clad surrounding the plurality of cores, arranged to form interfaces in accordance with the relationship with the plurality of cores, and made of a material having a refractive index n3; and
core intersection spaces formed by the plurality of cores intersecting each other and made of a material having a refractive index n1,
wherein a difference among the refractive indices is set as follows: n1 (core intersection)>n2 (core)>n3 (clad),
a lid made of the material having the refractive index n2 is disposed on upper and lower planes of the core intersection space, and
a refractive index ratio n2/n3 at an interface formed in accordance with the relationship between the core and the clad is equal to a refractive index ratio n1/n2 at an interface formed in accordance with the relationship between the core intersection space and the lid.

2. An optical waveguide comprising:
a plurality of linear cores arranged in a plane in a form of a monolayer core, including a combination of cores not parallel to one another in the plane, and made of a material having a refractive index n2;
a clad surrounding the plurality of cores, arranged to form interfaces in accordance with the relationship with the plurality of cores, and made of a material having a refractive index n3; and
core intersection spaces formed by the plurality of cores intersecting each other and made of the material having the refractive index n2,
wherein a difference between the refractive indices is set as follows: n2 (core)>n3 (clad),
each of the core intersection spaces is separated from four intersecting cores at four side planes of the core intersection space,
four gaps each of which has a spacing δ are formed between the four separated cores and the core intersection space, and
the four separated gaps, each of which has the spacing δ, are filled with the material having the refractive index n3,
wherein the gap spacing δ is 1 to 6 μm under conditions that the dimensions of the intersection space are H (height)=

W1 (width)=W2 (width)=30 to 50 μm and a relative difference in refractive index Δ, calculated by $((n2)^2-(n3)^2)/2(n3)^2$, =2 to 5%.

3. The optical waveguide according to claim 2, wherein the refractive index n2 of the cores is 1.593 and the refractive index n3 of the clad is 1.542.

4. The optical waveguide according to claim 2, wherein the refractive index n2 of the cores ranges from 1.4 to 1.6.

5. The optical waveguide according to claim 2, wherein the refractive index n3 of the clad ranges from 1.4 to 1.6.

6. An optical waveguide comprising:
- a plurality of linear cores arranged in a plane in a form of a monolayer core, including a combination of cores not parallel to one another in the plane, and made of a material having a refractive index n2;
- a clad surrounding the plurality of cores, arranged to form interfaces in accordance with the relationship with the plurality of cores, and made of a material having a refractive index n3; and
- core intersection spaces formed by the plurality of cores intersecting each other and made of the material having the refractive index n2, wherein a difference between the refractive indices is set as follows: n2 (core)>n3 (clad), each of the core intersection spaces is separated from four intersecting cores at four side planes of the core intersection space, four gaps each of which has a spacing δ are formed between the four separated cores and the core intersection space, and the four separated gaps, each of which has the spacing δ, are filled with the material having the refractive index n3, wherein the gap spacing 8 is 2 μm under conditions that the dimensions of the intersection space are H (height)=W1 (width)=W2 (width)=35 μm and a relative difference in refractive index Δ, calculated by $((n2)^2-(n3)^2)/2(n3)^2$, = 5%.

* * * * *